(12) United States Patent
Zen et al.

(10) Patent No.: US 8,091,758 B2
(45) Date of Patent: Jan. 10, 2012

(54) WAVE SOLDERING BATH

(75) Inventors: Mitsuo Zen, Souka (JP); Satoshi Ozawa, Chiba (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 508 days.

(21) Appl. No.: 11/883,846

(22) PCT Filed: Feb. 6, 2006

(86) PCT No.: PCT/JP2006/301976
§ 371 (c)(1),
(2), (4) Date: Mar. 10, 2010

(87) PCT Pub. No.: WO2006/082960
PCT Pub. Date: Aug. 10, 2006

(65) Prior Publication Data
US 2010/0163599 A1    Jul. 1, 2010

(30) Foreign Application Priority Data
Feb. 7, 2005   (JP) ................................. 2005-030957

(51) Int. Cl.
*B23K 31/02* (2006.01)
(52) U.S. Cl. ............................... 228/33; 228/36; 228/37
(58) Field of Classification Search .................... 228/33, 228/36, 37
See application file for complete search history.

(56) References Cited

U.S. PATENT DOCUMENTS

| 3,752,383 A | 8/1973 | Allen et al. | 228/37 |
| 2004/0211816 A1* | 10/2004 | Ogawa | 228/37 |
| 2008/0093417 A1* | 4/2008 | Takaguchi et al. | 228/37 |

FOREIGN PATENT DOCUMENTS

| FR | 2682903 | 4/1994 |
| JP | 4819425 | 6/1973 |
| JP | 4898520 | 11/1973 |
| JP | 50148327 | 12/1975 |
| JP | 513632 | 1/1976 |
| JP | 62259665 | 11/1987 |
| JP | 01071572 | 3/1989 |
| JP | 619968 | 3/1994 |
| JP | 2003053529 | 2/2003 |
| JP | 2005028446 | 2/2005 |

* cited by examiner

*Primary Examiner* — Jessica L Ward
*Assistant Examiner* — Erin Saad
(74) *Attorney, Agent, or Firm* — Michael Tobias

(57) ABSTRACT

In a conventional wave soldering bath, molten solder spouted from a second discharge nozzle did not have a uniform height, oxides were spouted from the nozzle opening and adhered to printed circuit boards, and constituent parts of the wave soldering bath were eroded. In a wave soldering bath according to the present invention, a cylinder is disposed at one end of a duct, a spiral pump is installed in the cylinder, and the width of a nozzle opening is made narrower than the width of the duct.

10 Claims, 6 Drawing Sheets

WAVE SOLDERING BATH

TECHNICAL FIELD

This invention relates to a wave soldering bath for soldering of printed circuit boards by spouting molten solder.

BACKGROUND ART

Soldering of printed circuit boards which are incorporated into household electrical appliances such as televisions and videos is generally performed by an automatic soldering apparatus. An automatic soldering apparatus is equipped with processing units such as a fluxer, a preheater, a wave soldering bath, and a cooler. As a printed circuit board is being transported by a conveyor, it is coated with flux by the fluxer, preheated by the preheater, has solder adhered to it in the wave soldering bath, and is cooled by the cooler to carry out soldering.

All the processing units installed in an automatic soldering apparatus have an effect on the quality of soldering, but a wave soldering bath has the most influence. Namely, depending on the state of spouting of solder in a wave soldering bath, soldering defects may develop or oxides may adhere to printed circuit boards. Although the processing units of an automatic soldering machine can be stably used for long periods, a wave soldering bath has a shorter service life than the other processing units.

A wave soldering bath is equipped with a first discharge nozzle which spouts molten solder in an agitated state and a second discharge nozzle which spouts molten solder in a gentle state. Since molten solder which is spouted from the first discharge nozzle is in an agitated state, it easily penetrates to locations which are difficult for molten solder to reach, such as through holes of printed circuit boards and corners of surface mounted parts placed thereon, and serves to eliminate unsoldered portions. However, because the molten solder is agitated, when it adheres to a printed circuit board, it forms bridges where it adheres between adjoining portions to be soldered, or icicles develop in which solder adheres to the ends of leads in a horn shape. Therefore, the bridges and icicles are rectified by contacting a printed circuit board having these bridges and icicles developed thereon with the gently spouting molten solder from the second discharge nozzle.

Various methods and means have been proposed for agitating the molten solder by the first discharge nozzle. Each of these proposals exhibits an effect so that elimination of unsoldered portions has been achieved to a certain extent. On the other hand, the second discharge nozzle has not been considered to require any special means or to have any problems since it merely produces a gently spouting state. The second discharge nozzle of a conventional wave soldering bath will next be explained. FIG. 4 is a front cross-sectional view of the second discharge nozzle of a conventional wave soldering bath, FIG. 5 is a partially cutaway perspective view thereof, and FIG. 3 is a side cross-sectional view thereof.

A wave soldering bath 20 has a first discharge nozzle (not illustrated) and a second discharge nozzle 21 installed therein. The wave soldering bath 20 contains molten solder 22. An unillustrated electric heater melts the solder and maintains is molten solder at a predetermined temperature. The second discharge nozzle 21 is constituted by a duct 23, an impeller pump 24, a nozzle opening member 25, and a distributing plate 26.

A pump chamber 27 extending for an arc of roughly ¾ of a circle is formed at one end of the duct 23, and a discharge pump 24 is installed in the pump chamber. As shown in FIGS. 4 and 5, the impeller pump frequently used in conventional discharge nozzles has a large number of blades 28 mounted in a radial direction. A shaft 29 is secured at the center of the top of the impeller pump 24, and the upper end of the shaft is connected to an unillustrated motor. An inlet port 30 is formed in the bottom of the pump chamber 27.

The other end of the duct 23 forms an upwardly extending engaging portion 31. As shown in FIG. 5, the duct of the second discharge nozzle in a conventional wave soldering bath narrows at the outlet of the pump chamber 27 and gradually widens as it extends to the engaging portion 31. The reason why the width of the duct increases in the direction from the outlet of the pump chamber toward the engaging portion is that the impeller pump sweeps molten solder which flows in from the bottom of the pump chamber with the large number of blades, and the outlet of the pump chamber is narrowed in order to increase the pressure inside the pump chamber and discharge molten solder into the duct. However, if the duct width remains narrow, the amount of molten solder which reaches the nozzle opening becomes small. Therefore, the duct is gradually widened between the pump chamber and the engaging portion. As shown in FIG. 6, the width ($W_3$) of the nozzle opening in the second discharge nozzle of a conventional wave soldering bath is the same as the width ($W_4$) of the duct.

The nozzle opening member 25 is sealingly engaged with the engaging portion 31 of the duct, and the distributing plate 26 having a large number of holes 32 bored therein extends across the engaging portion. Molten solder which is discharged from the pump chamber into the duct in an energetic state becomes turbulent, and if it is spouted from the nozzle opening of the second discharge nozzle in this condition, a gently spouting state cannot be obtained. Therefore, the turbulent flow undergoes straightening by the distributing plate. The turbulent flow is straightened when it passes through the large number of holes in the distributing plate, and a gently spouting flow emerges from the nozzle opening. The distributing plate not only performs straightening of turbulence but also has the effect of removing oxides which enter the molten solder as contaminants. In a wave soldering bath, oxides are floating on the surface of the molten solder surrounding the nozzle opening member, and when molten solder which has been spouted from the nozzle opening falls onto the surface of the surrounding molten solder, oxides which have a lower specific gravity are entrained by the falling molten solder and caused to sink downwards in the molten solder. Oxides which sink downwards in this manner are sucked into the impeller pump which energetically sucks molten solder. The oxides enter the duct, are spouted from the nozzle opening together with molten solder, and adhere to printed circuit boards. The distributing plate installed in the upper portion of the duct causes oxides to adhere to the distributing plate and prevents them from moving upwards from the distributing plate.

The nozzle opening member 25 has a front plate 33 installed on the entrance side of a printed circuit board and a rear plate 34 installed on the exit side of a printed circuit board. The front plate makes molten solder spouted from the nozzle opening flow towards the entrance side, thereby remelting and eliminating bridges and icicles formed by the first discharge nozzle. However, if a printed circuit board exits from the second discharge nozzle in this state, the amount of solder adhered to the portions being soldered becomes small. Therefore, the rear plate is adapted to adhere a suitable amount of solder. In the rear plate, molten solder flows in the same direction as the direction of travel of a printed circuit broad at approximately the same speed as the speed of travel of the printed circuit board, so a suitable amount of solder adheres to a printed circuit board contacted by molten solder flowing from the rear plate. As shown in FIG. 6, in the second discharge nozzle of a conventional wave soldering bath, since the width of the duct and the width of the nozzle opening member are the same, molten solder which flows into the duct is spouted upwards in the same state and forms a gently spouting state.

The state of spouting from the second discharge nozzle in a conventional wave soldering bath will be explained. The impeller pump 24 is rotated by driving an unillustrated motor which rotates the shaft 29. Molten solder present between the large number of blades 28 of the impeller pump 24 is then swept by the blades and flows from the pump chamber 27 into the duct 23. At this time, since molten solder is no longer present between the blades 28 of the impeller pump 24, molten solder is energetically sucked into the pump chamber 27 through the inlet port 30 in the bottom of the pump chamber 27. As shown by the arrows in FIG. 4, molten solder which flows into the duct 23 strikes against the front end of the duct with a high flow speed and changes its flow direction upwards. Because the flow speed of molten solder at this time is fast and because it strikes the front end of the duct and changes its flow direction, it becomes turbulent. This turbulent flow undergoes straightening by the large number of holes 32 in the distributing plate 26 extending across the engaging portion 31 of the duct and then spouts upwards through the nozzle opening member 25. An unillustrated printed circuit board which has been soldered by the first discharge nozzle contacts the molten solder spouting from the second discharge nozzle, whereby bridges and icicles formed by the first discharge nozzle are rectified and a suitable amount of solder is adhered before the printed circuit board then moves away from the second discharge nozzle.

The impeller pump shown in FIGS. 4 and 5 is the most common type of pump used in a conventional wave soldering bath, but a spiral pump has also been proposed (Patent Documents 1-5).

Patent Document 1: JP S48-19425 U1
Patent Document 2: JP S48-98520 U1
Patent Document 3: JP S50-148327 U1
Patent Document 4: JP S51-3632 U1
Patent Document 5: JP S62-259665 A1

DISCLOSURE OF INVENTION

In the above-described conventional wave soldering bath, there were cases in which solder did not uniformly adhere over the entirety of a printed circuit board, in which oxides adhered to the printed circuit board, or in which parts constituting the wave soldering bath were eroded. On the other hand, in a conventional wave soldering bath equipped with a spiral pump, the height of molten solder spouted from the nozzle opening member could not be made sufficiently high. As a result, the speed of molten solder flowing on the rear plate could not be controlled, and it was difficult to adhere a suitable amount of solder. This invention was made in light of these problems of conventional wave soldering baths, and it provides a wave soldering bath which can uniformly adhere solder over the entirety of a printed circuit board, and which not only has no adhesion of oxides but which does not have erosion of constituent parts of the wave soldering bath and which can spout a sufficient amount of molten solder from a nozzle opening.

As a result of diligent investigations by the present inventors concerning the problems of conventional wave soldering baths, it was found that the reason why solder does not uniformly adhere over the entirety of a printed circuit board by the second discharge nozzle of a conventional wave soldering bath is that, as shown in FIG. 4, the height of spouting is not uniform. Namely, the height ($H_1$) in a location above the front end of the duct is high and the height ($H_2$) in a location closer to the pump chamber is low. As shown by the arrows in FIG. 4, this is thought to be because at the front end of the duct in the second discharge nozzle, molten solder discharged from the pump chamber having a high flow speed energetically impacts the front end of the duct and flows upwards with keeping the high flow speed, so the height of molten solder becomes large. In contrast, in a location closer to the pump chamber, almost all of the molten solder flowing at a high flow speed flows toward the front end of the duct, and the amount which flows upwards in the vicinity of the pump chamber is small, thereby making the height of solder low.

The reason why oxides adhere to printed circuit boards in a conventional wave soldering bath is that the impeller pump rotates at a high speed and energetically sucks in molten solder from below the pump. Therefore, as stated above, oxides which were entrained by molten solder spouted from the nozzle and sank downwards are sucked into the pump chamber together with molten solder. Oxides which enter the pump chamber then reach the nozzle opening through the duct and adhere to printed circuit boards. A distributing plate is installed in the second discharge nozzle of a conventional wave soldering bath such that oxides which reach the vicinity of the holes in the distributing plate adhere to the distributing plate. However, it does not have the effect of completely removing oxides, and the adhered oxides accumulate and grow in the periphery of the holes. If the oxides which have increased in size separate from the distributing plate, it may adhere to printed circuit boards with this increased size. Accordingly, it is desirable to use a distributing plate in a wave soldering bath as little as possible.

Erosion of constituent parts occurs in a conventional wave soldering bath because molten solder flowing inside the duct has a rapid flow speed. The constituent parts of a wave soldering bath use stainless steel which is difficult for solder to adhere to, but even so, stainless steel ends up being eroded. The surface of stainless steel is covered by a strong film of oxides of Ni and Cr which forms a barrier and prevents the adhesion of molten solder. The reason why stainless steel is eroded in molten solder is that when the surface oxide film is removed and a clean metal surface appears, Fe and Ni, which are components of the stainless steel, alloy with Sn in the molten solder. If components of stainless steel alloy with Sn, the resulting alloys, which have a decreased melting point, melt into the molten solder. Erosion occurs due to gradual spreading of alloying, and eventually holes are formed in constituent parts of the wave soldering bath or the constituent parts are deformed.

The reason why erosion occurs in a wave soldering bath, i.e., why oxides are removed from the surface of stainless steel is because molten solder flows rapidly and energetically strikes the surface. As a result, the surface of stainless steel is rubbed by molten solder and oxides are removed. Therefore, as shown in FIG. 4, portions where erosion easily occurs in a wave soldering bath include the inlet A of the duct where molten solder energetically flows into the duct, the blades B of the impeller pump which sweep the molten solder, the narrow portion C of the duct where molten solder rapidly flows, the front end D of the duct which is struck by molten solder with a high flow speed, and the distributing plate E where the large number of holes are rubbed when molten solder passes them.

As a result of diligent investigations with the object of eliminating problems which occur in a conventional wave soldering bath such as nonuniformity in the height of spouted solder, adhesion of contaminant oxides to printed circuit boards, and erosion of constituent parts of a wave soldering bath, the present inventors found that it is effective to eliminate a rapid flow when molten solder is flowing inside a duct, and they completed the present invention. Namely, instead of molten solder being made to rapidly flow inside a duct, pressure is applied from one end of a duct to molten solder inside the duct and the pressure is propagated to molten solder inside the duct such that the propagated pressure causes molten solder to spout from a nozzle opening at the other end of the duct.

The present invention is a wave soldering bath equipped with a first discharge nozzle from which molten solder is spouted in an agitated state and a second discharge nozzle from which molten solder is gently spouted, characterized in that the second discharge nozzle comprises a duct, a cylinder formed at the lower portion of one end of the duct, the cylinder having a height lower than the height of the duct and being open at its upper and lower ends, a spiral pump installed inside the cylinder, and a nozzle opening having a width which is narrower than the width of the duct and installed in the upper portion of the other end of the duct.

In a wave soldering bath according to the present invention, a spiral pump installed at one end of a duct causes pressure to be propagated inside the duct rather than making solder energetically flow inside the duct. Even if there is flow of molten solder, the flow speed is extremely low. Therefore, in a wave soldering bath according to the present invention, pressure formed at one end of the duct is propagated toward a nozzle opening installed at the other end of the duct, and the same pressure is applied to the entirety of molten solder in the nozzle opening, thereby making it possible to sprout molten solder from the nozzle opening without variations in height and cause molten solder to uniformly contact a printed circuit board without the occurrence of excessive surface covering or unsoldered portions.

In addition, in a wave soldering bath according to the present invention, molten solder propagates pressure from a spiral pump to a discharge nozzle and does not strongly rub against or strongly strike constituent parts which conventionally underwent erosion. Therefore, erosion does not take place.

In a wave soldering bath according to the present invention, the inlet of a cylinder faces downwards, and molten solder is gently sucked into the cylinder. Therefore, oxides are not sucked in at all, and oxides do not adhere to printed circuit boards. A distributing plate has been used in order to weaken energetic flow so as to produce uniform spouting, and it also functions to impede the passage of oxides. In a wave soldering bath according to the present invention, however, as described above, the flow of molten solder inside a duct is slow and turbulence does not occur. Therefore, not only is it unnecessary to perform flow straightening, but there is also no inclusion of oxides, and it is not necessary to install a distributing plate. A distributing plate accumulates oxides and is eroded by molten solder thereby changing the composition of solder, so it is desirable to use such a plate as little as possible. In the present invention, a distributing plate which becomes a problem in the above-described manner is entirely unnecessary.

Figure 1:
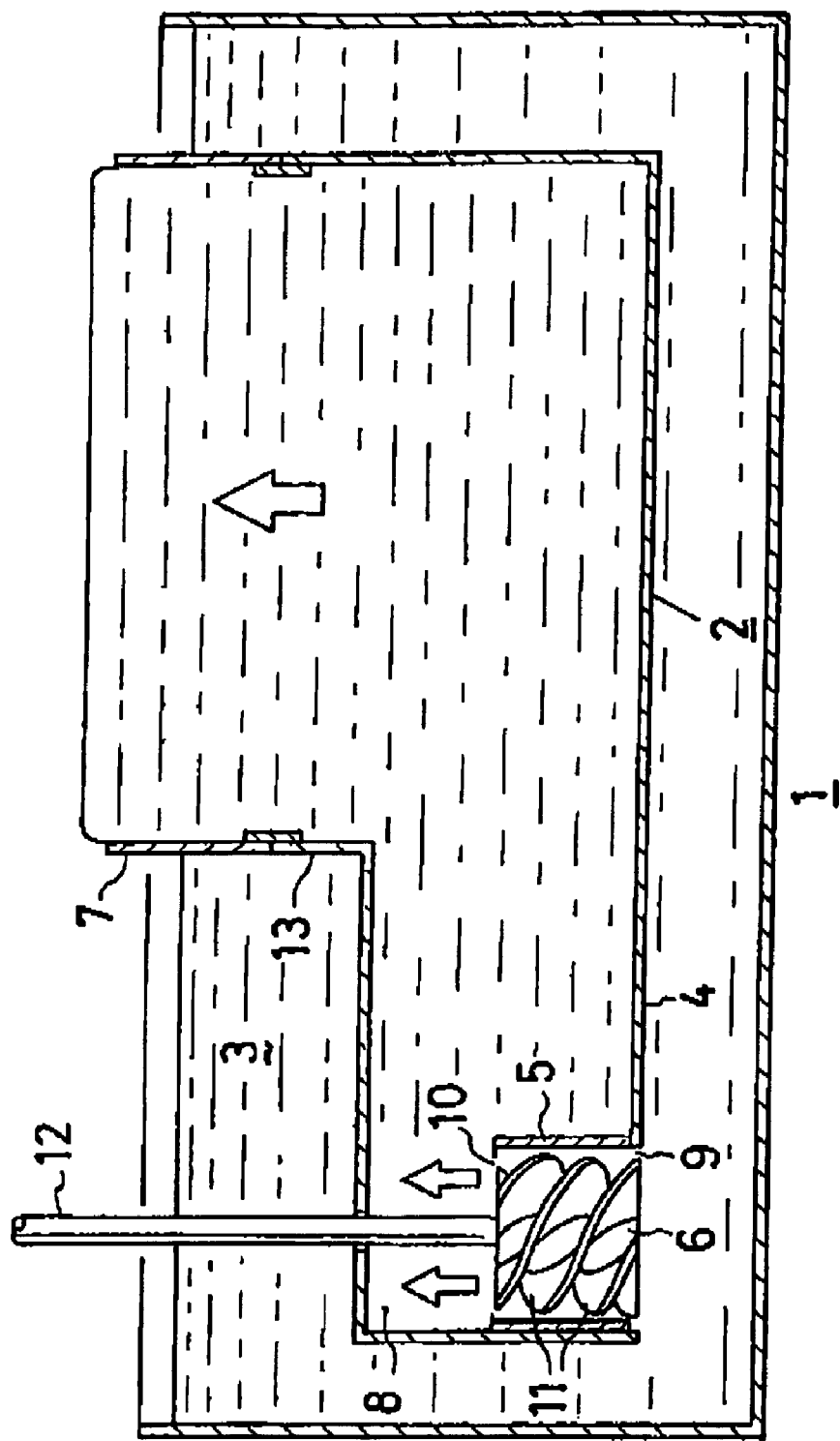
FIG. 1 is a front cross-sectional view of a wave soldering bath according to the present invention.

LIST OF REFERENTIAL NUMERALS 1 wave soldering bath
2 second discharge nozzle
3 molten solder
4 duct
5 cylinder
6 spiral pump
7 nozzle opening (member)

BEST MODE FOR CARRYING OUT THE INVENTION

A spiral pump used in a wave soldering bath according to the present invention does not produce a rapid flow by intake and discharge of flow like a conventional impeller pump and can apply pressure to molten solder. A spiral pump can apply pressure to molten solder by successively discharging molten solder by helical blades. A spiral pump used in a conventional wave soldering bath has one blade. As a result, there were cases in which the amount of discharged molten solder was insufficient, or in which there was pulsating flow, i.e., in which molten solder moved up and down in the nozzle opening. If the number of blades of the spiral pump is made a plurality of blades and preferably 4 blades, a large amount of molten solder can be discharged, and smooth flow can be formed without pulsating of the flow. In the present invention, a spiral pump is installed inside a cylinder having an opening at its upper and lower portions, molten solder is sucked from below it, and pressure is applied upwards. Therefore, molten solder does not flow rapidly. In addition, as the spiral pump sucks from below it, oxides floating on the surface of the molten solder are not sucked in at all.

Figure 3:
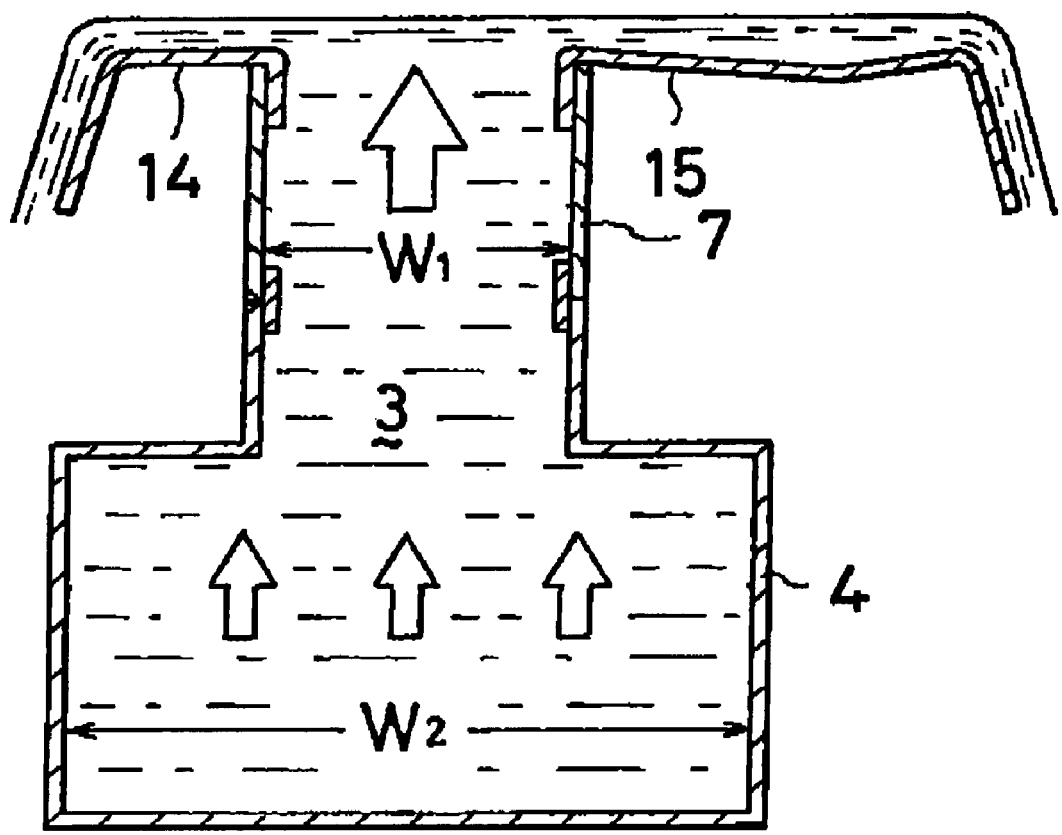
FIG. 3 is a side cross-sectional view of a second discharge nozzle installed in a wave soldering bath according to the present invention.
Figure 4:
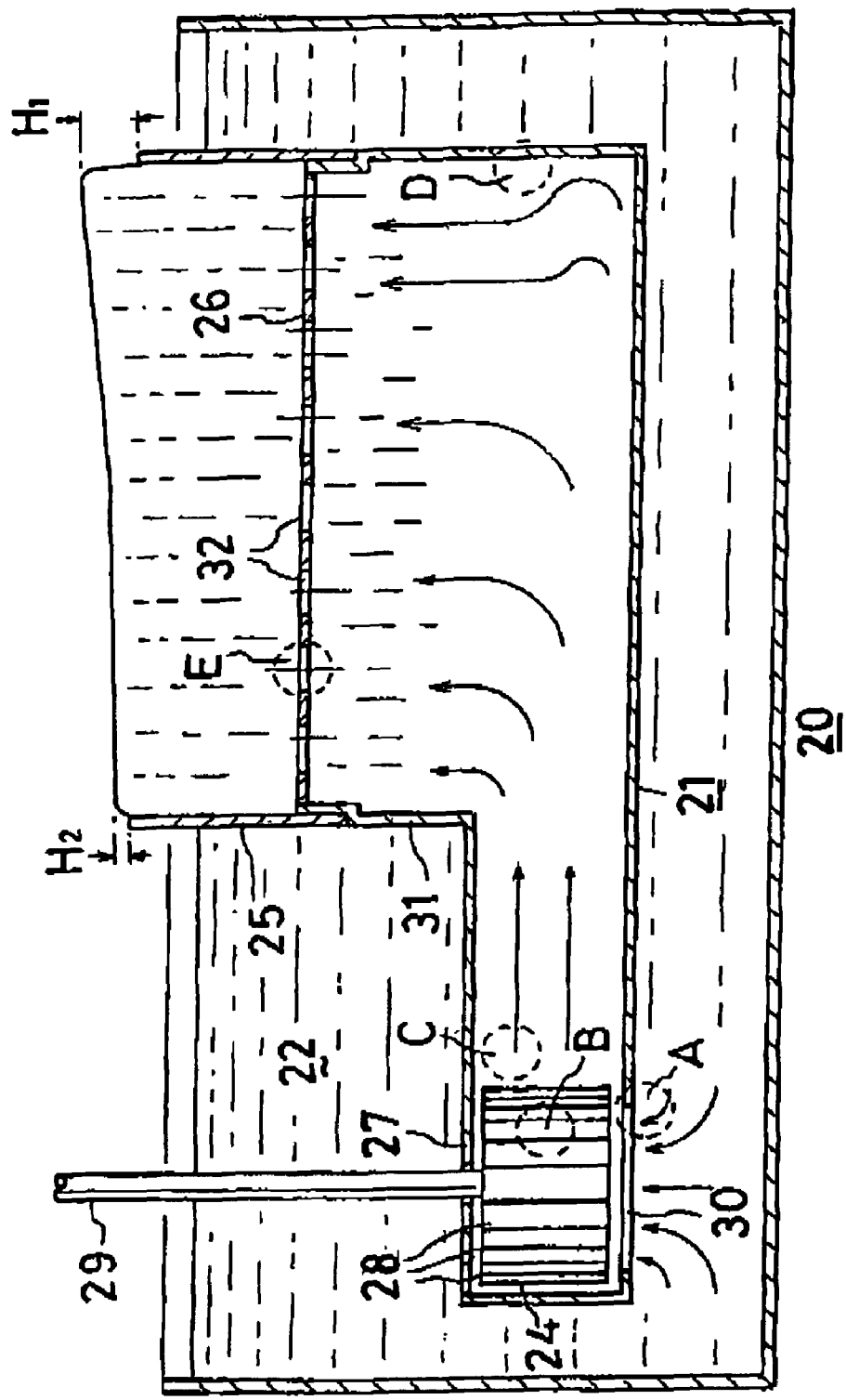
FIG. 4 is a front cross-sectional view of a wave soldering bath according to the present invention.
Figure 5:
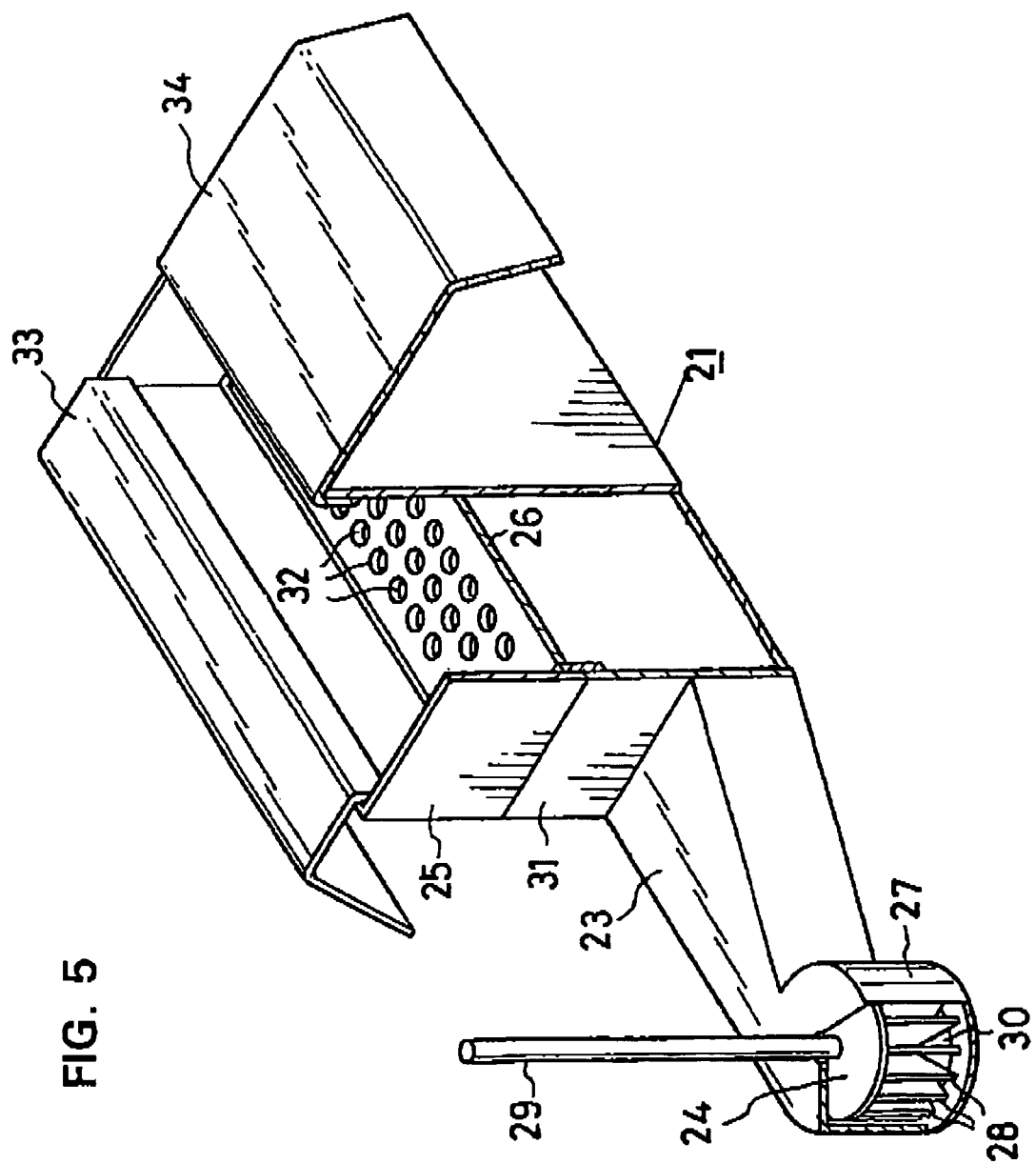
FIG. 5 is a partially cutaway perspective view of a second discharge nozzle installed in a conventional wave soldering bath.
Figure 6:
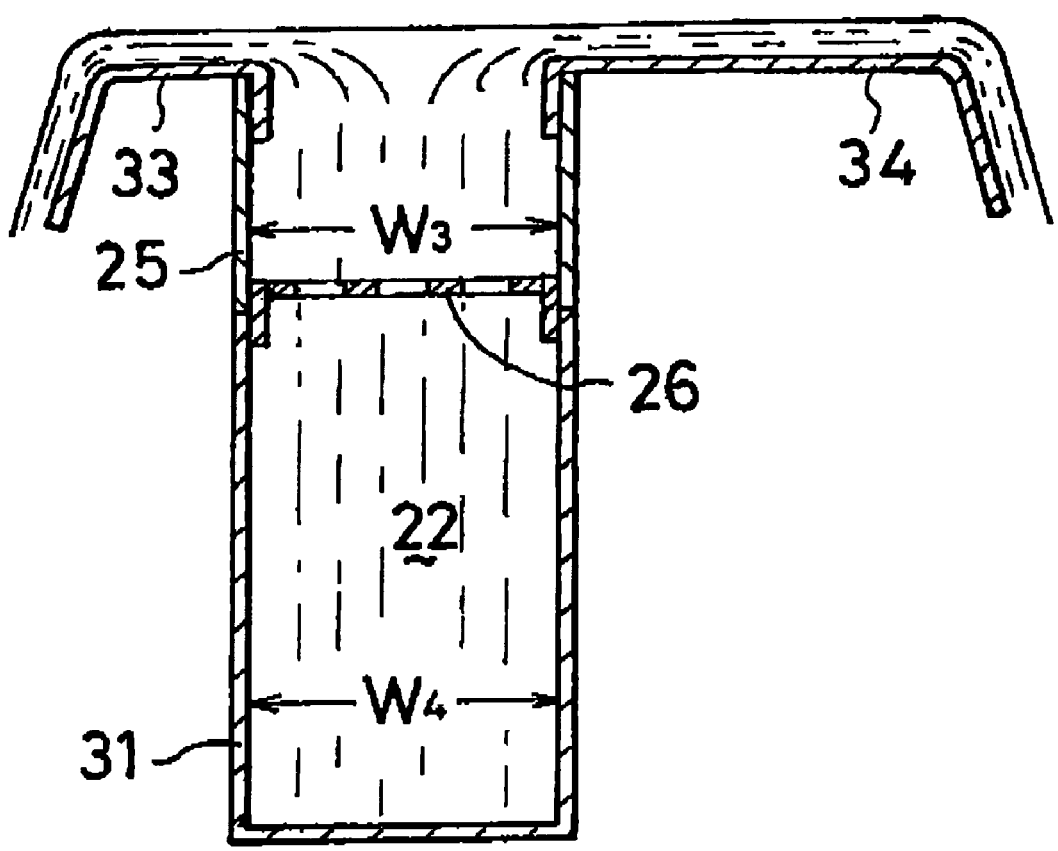
FIG. 6 is a side cross-sectional view of a second discharge nozzle installed in a conventional wave soldering bath.

As shown in FIG. 3, in a wave soldering bath according to the present invention, the width $W_1$ of the nozzle opening member is narrower than the width $W_2$ of the duct. By making the width of the discharge nozzle narrower than the width of the duct in this manner, when the pressure of a larger volume of molten solder inside the duct is propagated to the smaller volume of molten solder inside the nozzle, in accordance with Pascal's principle, a larger amount of molten solder flows into the discharge nozzle, and a higher level of spouting is obtained from the discharge nozzle.

Figure 2:
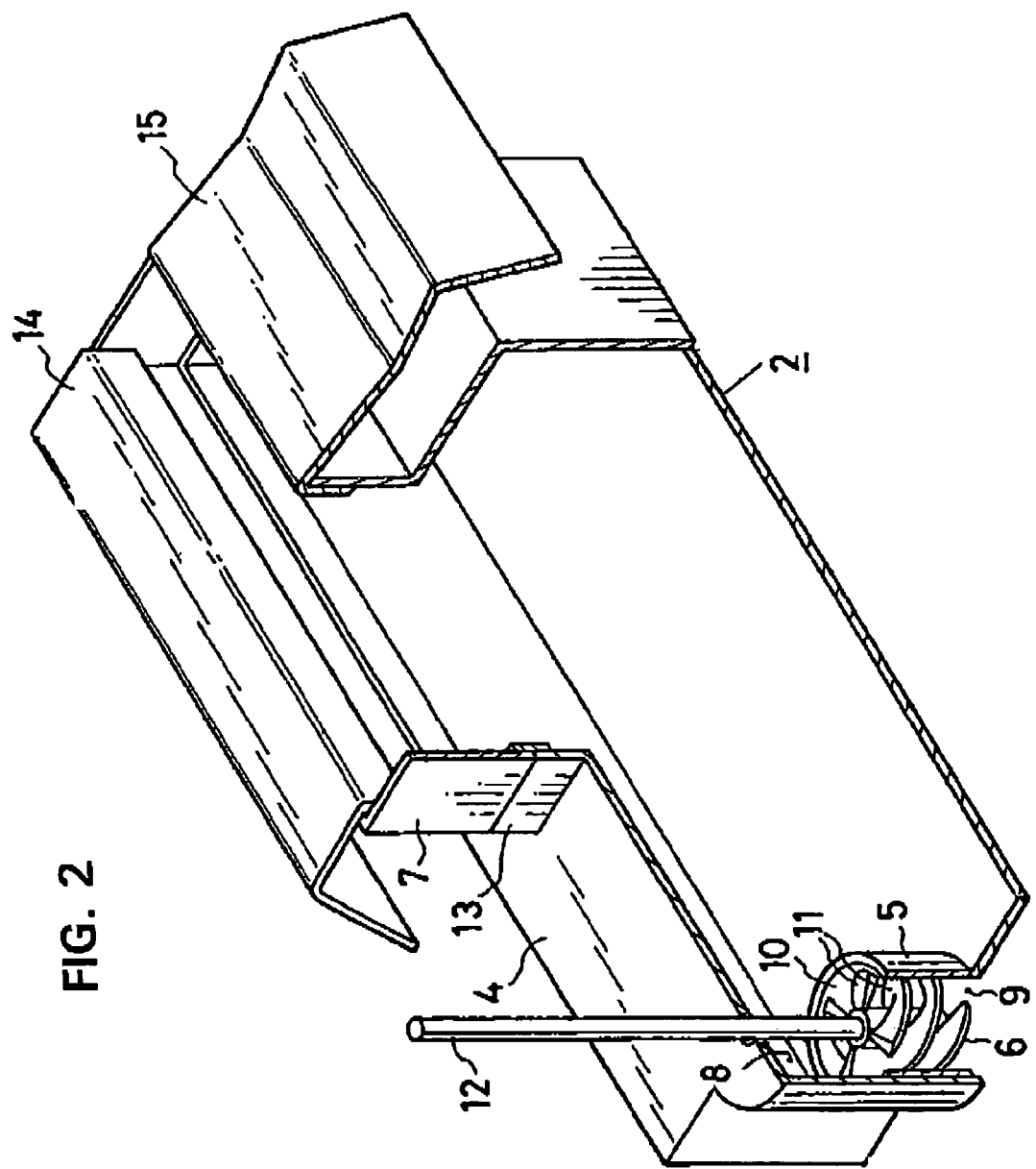
FIG. 2 is a partially cutaway perspective view of a second discharge nozzle installed in a wave soldering bath according to the present invention.

A wave soldering bath according to the present invention will be explained below based on the drawings. FIG. 1 is a partially cutaway perspective view of a second discharge nozzle installed in a wave soldering bath according to the present invention, FIG. 2 is a front cross-sectional view thereof, and FIG. 3 is a side cross-sectional view thereof.

A wave soldering bath 1 has a first discharge nozzle (not shown) and a second discharge nozzle 2 installed therein. The wave soldering bath contains molten solder 3. The molten solder is melted and maintained at a predetermined temperature by an unillustrated heater. The second discharge nozzle 2 is constituted by a duct 4, a cylinder 5, a spiral pump 6, and a nozzle opening member 7.

A box-shaped duct 4 is installed inside the wave soldering Bath 1. A semi-cylindrical pressure chamber 8 is formed at one end of the duct 4. A cylinder 5 which is open at its upper and lower ends is installed in the lower portion of the pressure chamber 8. Of the openings of the cylinder 5, the lower opening functions as an inlet port 9, and the upper opening as a pressure port 10. The height of the cylinder 5 is lower than the height of the pressure chamber 8, and the bottom end of the cylinder 5 is disposed at the same level as the bottom surface of the duct 4. As a result, there is adequate space between the upper end of the cylinder 5 and the ceiling of the pressure chamber 8.

A spiral pump 6 is installed inside the cylinder 5. Four helical blades 11 are installed on the spiral pump 6. A shaft 12 is secured to the center of the upper portion of the spiral pump 6. The shaft passes through the ceiling of the pressure chamber 8 and projects above the surface of the molten solder 3 contained in the wave soldering bath 1. The upper end of the shaft 12 is connected to an unillustrated motor.

An elongated rectangular engaging portion 13 extends upwards from the other end of the duct 4. A nozzle opening member 7 sealingly engages with the engaging portion. As shown in FIG. 3, in a wave soldering bath according to the present invention, the width $W_1$ of the nozzle opening member 7 is smaller than the width $W_2$ of the duct 4. A front plate 14 is installed on the nozzle opening 7 on the entrance side of a printed circuit board and a rear plate 15 is installed thereon on the exit side of a printed circuit board. The operation of the front plate and the rear plate is the same as described above, so an explanation thereof will be omitted.

Next, the state of spouting in a wave soldering bath according to the present invention having the above-described structure will be explained. First, when the unillustrated motor is driven to rotate the shaft 12, the spiral pump 6 inside the cylinder 5 rotates. Once the spiral pump rotates, molten solder flows into the cylinder from the inlet port 9, and molten solder inside the cylinder is pushed out through the pressure port 10, whereby pressure is applied to molten solder 2 inside the pressure chamber 8. The pressure is propagated to molten solder inside the duct 4 and to molten solder inside the nozzle opening 7. As a result, molten solder inside the nozzle opening 7 is made to spout upwards. The upwardly spouting molten solder is in a gently spouting state and flows along the front plate 14 and the rear plate 15.

At this time, the molten solder inside the duct is in such a state that it propagates pressure. Namely, even though the molten solder is moving, it is flowing extremely slowly. Therefore, constituent parts which are contacted by molten solder are not strongly rubbed or struck by it. Accordingly, erosion does not take place in a wave soldering bath according to the present invention. In addition, in a wave soldering bath according to the present invention, even if oxides floating in the vicinity of the discharge nozzle are entrained by molten solder which was spouted and sink to the lower portion of the molten solder, the pressure pump does not suck the underneath molten solder at a high speed, so the oxides which sank downwards are not sucked into the duct. As a result, the problem of oxides adhering to a printed circuit board at the time of soldering does not occur in a wave soldering bath according to the present invention.

INDUSTRIAL APPLICABILITY

In this embodiment of the present invention, a second discharge nozzle which gently spouts molten solder was explained, but it should be understood that the present invention can also be applied to a first discharge nozzle which spouts molten solder in an agitated state.

The invention claimed is:

1. A wave soldering bath comprising a bath body and a nozzle disposed in the bath body, the nozzle comprising:
   a duct having a bottom surface spaced from a bottom inner surface of the bath body over an entire length of the duct and having a horizontally extending portion which extends generally horizontally in a first direction between a first end and a second end thereof, an inlet for molten solder comprising an opening formed in the bottom surface of the first end, and an engaging portion extending generally vertically upwards from the second end, the engaging portion having an outlet for molten solder at its upper end, the duct having a lengthwise direction and a widthwise direction and having a width in the widthwise direction which is greater than a width of the engaging portion measured in a direction parallel to the widthwise direction of the duct;
   a cylinder disposed in the first end of the horizontally extending portion of the duct, the cylinder having a lower open end communicating with the inlet and an upper open end opposing and spaced from an upper inner surface of the first end of the horizontally extending portion; and
   a spiral pump rotatably disposed inside the cylinder for drawing fluid upwards through the inlet and into the duct from a space between the bottom surface of the duct and the bottom inner surface of the bath body.

2. A wave soldering bath as claimed in claim 1 wherein the spiral pump has four helical blades.

3. A wave soldering bath as claimed in claim 1 including a pressure chamber inside the duct into which fluid is discharged from the upper end of the cylinder and having (a) a top wall spaced from the upper end of the cylinder and (b) a semicylindrical side wall extending from an upper end of the cylinder to the top wall.

4. A wave soldering bath as claimed in claim 1 wherein the width of the duct in its widthwise direction is constant over the length of the duct.

5. A wave soldering bath as claimed in claim 1 wherein the cylinder extends upwards from the opening in the bottom surface of the duct.

6. A wave soldering bath comprising a bath body and a nozzle disposed in the bath body, the nozzle comprising:
   a horizontally-extending duct having a top wall, a bottom wall spaced from a bottom inner surface of the bath body, and side walls extending between the top wall and the bottom wall of the duct, and an engaging portion extending generally vertically upwards from the top wall of the duct, the engaging portion having an outlet for molten solder at its upper end, the duct having a lengthwise direction and a widthwise direction and having a width in the widthwise direction which is greater than a width of the engaging portion measured in a direction parallel to the widthwise direction of the duct;
   a cylinder connected to the duct and having a lower end defining an inlet in the bottom wall of the duct opposing and spaced from the bottom inner surface of the bath body and an upper end opposing the lower end and spaced from the top wall of the duct; and
   a spiral pump rotatably disposed inside the cylinder for drawing fluid from the bath body into the inlet of the cylinder and discharging the fluid out of the cylinder and into the duct from the upper end of the cylinder.

7. A wave soldering bath as claimed in claim 6 including a pressure chamber disposed inside the duct above the upper end of the cylinder and into which the pump discharges fluid from the upper end of the cylinder, a ceiling opposing and spaced from the upper end of the cylinder, a semicylindrical side wall extending to the ceiling, and an opening disposed on an opposite side of the pressure chamber from the side wall through which fluid from the pressure chamber is discharged into the duct.

8. A wave soldering bath as claimed in claim 6 wherein the bottom wall of the duct is spaced from the bottom inner surface of the bath body over an entire length of the duct.

9. A wave soldering bath as claimed in claim 7 wherein the ceiling comprises the top wall of the duct.

10. A wave soldering bath as claimed in claim 7 wherein the side wall of the pressure chamber is formed by a semicylindrical end wall of the duct which extends concentrically partway around an exterior of the cylinder.

* * * * *